United States Patent
Sauter et al.

(10) Patent No.: US 11,320,040 B2
(45) Date of Patent: May 3, 2022

(54) TRANSMISSION AND DRIVE TRAIN FOR A MOTOR VEHICLE

(71) Applicant: ZF Friedrichshafen AG, Friedrichshafen (DE)

(72) Inventors: Bernhard Sauter, Tettnang (DE); Dirk Winkler, Bad Waldsee (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 24 days.

(21) Appl. No.: 16/830,616

(22) Filed: Mar. 26, 2020

(65) Prior Publication Data
US 2020/0309246 A1    Oct. 1, 2020

(30) Foreign Application Priority Data
Mar. 27, 2019 (DE) ...................... 10 2019 204 189.2

(51) Int. Cl.
*F16H 57/04* (2010.01)
*F01M 11/00* (2006.01)
*F16H 57/02* (2012.01)

(52) U.S. Cl.
CPC ..... *F16H 57/0424* (2013.01); *F01M 11/0004* (2013.01); *F16H 57/02* (2013.01); *F16H 57/045* (2013.01); *F16H 57/0482* (2013.01); *F01M 2011/0033* (2013.01)

(58) Field of Classification Search
CPC ............ F16H 57/0424; F16H 57/0482; F01M 11/0004; F01M 2011/0033
See application file for complete search history.

(56) References Cited

U.S. PATENT DOCUMENTS

| | | | | |
|---|---|---|---|---|
| 7,984,791 B2 * | 7/2011 | Taguchi | ............... | F16H 57/0483 184/6.12 |
| 8,607,664 B2 * | 12/2013 | Solak | .................. | F16H 57/0447 74/606 R |
| 8,833,335 B2 * | 9/2014 | Karasawa | ........... | F16H 61/0031 123/196 R |

(Continued)

FOREIGN PATENT DOCUMENTS

| | | |
|---|---|---|
| DE | 102014204088 A1 | 9/2015 |
| DE | 112015001157 T5 | 12/2016 |

(Continued)

OTHER PUBLICATIONS

German Search Report DE102019204189.2 dated Nov. 18, 2019. (12 pages).

*Primary Examiner* — Syed O Hasan
(74) *Attorney, Agent, or Firm* — Dority & Manning, P.A.

(57) ABSTRACT

A transmission (G) for a motor vehicle includes a pump (P), an oil sump (S), a hydraulic control unit (HCU), a gear set (RS) for providing different transmission ratios between an input shaft (GW1) and an output shaft (GW2) of the transmission (G), and a cavity (HY) arranged on an input side, in which a torque converter (TC) and/or an electric machine (EM) are accommodated. The cavity (HY) is connected to the oil sump (S) via a gap (C) configured for a passive return of oil out of the cavity (HY) into the oil sump (S). In order to reduce the gap (C), a separating element (T) is configured for making it difficult for oil to flow out of the oil sump (S) to the cavity (HY). A drive train comprising such a transmission (G) is also provided.

14 Claims, 8 Drawing Sheets

(56) References Cited

U.S. PATENT DOCUMENTS

| | | |
|---|---|---|
| 10,634,234 B2 * | 4/2020 | Schilling ............ F16H 57/0424 |
| 2014/0105728 A1 | 4/2014 | Frait et al. |
| 2014/0231174 A1 | 8/2014 | Iwase et al. |
| 2017/0114886 A1 | 4/2017 | Matsushita et al. |
| 2018/0073626 A1 | 3/2018 | Schilling |
| 2021/0131551 A1 * | 5/2021 | Reid ................... F16H 57/0435 |

FOREIGN PATENT DOCUMENTS

| | | |
|---|---|---|
| DE | 102016210548 A1 | 12/2017 |
| DE | 102016217242 A1 | 3/2018 |

* cited by examiner

TRANSMISSION AND DRIVE TRAIN FOR A MOTOR VEHICLE

CROSS-REFERENCE TO RELATED APPLICATION

The present application is related and has right of priority to German Patent Application No 10 2019 204 189.2 filed on Mar. 27, 2019, which is incorporated by reference in its entirety for all purposes.

FIELD OF THE INVENTION

The invention relates generally to a transmission for a motor vehicle. The invention further relates generally to a drive train for a motor vehicle that includes such a transmission.

BACKGROUND

DE 10 2016 217 242 A1 describes, for example, such a transmission. Therein, two regions of the transmission are connected via a passage to an oil pan. The passage is spatially located between the two regions. The regions, apart from the passage, are separated from the oil pan with the aid of a separating section. If oil collects in the input-side region of such a transmission, a return flow of this oil into the oil pan is not readily possible. This can increase the drag losses of the transmission and is therefore undesirable.

DE 10 2016 210 548 A1 describes a transmission for a motor vehicle. Therein, a hybrid space of the transmission is separated from a main space of the transmission by a partition. The transmission includes a pump, which is driven by a drive source. In order to convey oil out of the hybrid space into the main space, a helical displacement unit is provided, which is operatively connected to the drive source. Such an approach increases the design complexity and the number of parts of the transmission.

SUMMARY OF THE INVENTION

Example aspects of the invention provide a transmission, which is distinguished by a simple configuration and an efficient return of oil into the oil sump.

As an example solution to the problem, a transmission for a motor vehicle is provided, which includes a pump, a hydraulic control unit, a gear set for providing different transmission ratios between an input shaft and an output shaft of the transmission, and a cavity arranged on the input side. A torque converter and/or an electric machine are/is accommodated in the cavity. The torque converter and/or the electric machine are/is preferably operatively connected to the input shaft of the transmission.

The pump is configured for scavenging or drawing oil out of the oil sump and delivering the oil to the hydraulic control unit. For this purpose, the pump can be designed, for example, as a vane pump or as a gear pump. The pump can be driven, for example, by a shaft of the transmission and/or by an electric motor provided specifically for this purpose. The hydraulic control unit is configured for feeding the oil delivered by the pump to components of the gear set as well as to the components arranged in the cavity. For this purpose, the hydraulic control unit can include valves, with the aid of which oil is suppliable to the various hydraulic consumers of the transmission according to demand. The valves can be controlled, by an open-loop system, with the aid of an electronic control unit.

The cavity is connected to the oil sump via a gap, so that a passive return of lube oil and/or cooling oil out of the cavity into the oil sump is possible without obstruction. A "passive return" is understood to mean, in this case, a return flow without additional measures or means, i.e., for example, without a pump provided specifically for this purpose.

According to example aspects of the invention, a separating element is provided for reducing the gap. The separating element is configured for making it difficult for oil to flow out of the oil sump in the direction of the cavity, although not for preventing this. Due to this constructionally simple measure, the oil can flow, unobstructed, out of the cavity back into the oil sump.

The separating element can be an integral part of a housing of the transmission, or can be designed as an oil guiding element connected to the housing.

Preferably, the separating element is immovable. "Immovable" is understood to mean, in this case, that an oil flow does not induce a movement of the separating element, as is the case, for example, with a movable flap. The separating element can have a mechanical flexibility, however, for example, by being designed as a thin-walled plastic shell.

Preferably, the separating element is oriented essentially horizontally, so that the separating element separates the cavity from a section of the transmission situated geometrically below the cavity. The descriptions "below" and "horizontally" relate to the installation position of the transmission in the motor vehicle.

Preferably, the separating element delimits, at least in sections or at least in part, a chamber connected to the oil sump. The separating element can be designed in such a way that an oil flow out of the oil sump into the cavity through the gap does not take place until the chamber is completely filled with oil. In other words, the separating element separates the cavity from the oil sump in sections, so that the chamber is formed below the cavity. In this way, an oil flow from the oil sump into the cavity due to an inclination of the motor vehicle including the transmission can be made difficult, provided the inclination angle does not exceed a limiting value.

Depending on the embodiment, the separating element can seal off or only cover the chamber with respect to the cavity, so that a small gap remains. If the remaining gap is small, the mode of operation of the chamber is only negligibly adversely affected.

Preferably, an electric motor, which is configured for driving the pump, is arranged in the chamber. As a result, the chamber can be utilized in the best way possible. In addition, the electric motor can be cooled by the oil in the chamber.

Preferably, the oil pump is driven via a gearwheel, the axis of rotation of which is spatially arranged between an axis of rotation of the input shaft and an axis of rotation of the pump shaft. The gearwheel extends, in sections or in part, through the gap between the oil sump and the cavity. A return flow of oil out of the cavity into the oil sump can be assisted by the gearwheel. In the same way, the gearwheel can make it difficult for oil to flow, starting from the oil sump, through the gap in the direction of the cavity. For example, at least one means, which is configured for conveying oil out of the gap in the direction of the oil sump, can be formed on or attached to the gearwheel. Multiple possible embodiments are conceivable for this purpose.

According to a first possible embodiment, the gearwheel includes multiple openings distributed at the circumference. The openings have a conical cross-section. Due to the conical cross-section, a pump effect can be generated from the cavity in the direction of the oil sump. Such openings are easy to manufacture, for example, via sintering.

According to a second possible embodiment, the gearwheel comprises includes at least one pump element, which is attached to the gearwheel or is formed directly thereon. The pump element can have, for example, a blade-like geometry, with the aid of which oil can be conveyed out of the cavity through the gap in the direction of the oil sump. The pump element can protrude from the gearwheel in the axial direction and, in fact, from one face end or from both face ends of the gearwheel.

According to a third possible embodiment, the at least one means can be formed by the toothing of the gearwheel itself. For example, the toothing can be designed as oblique toothing. The helix angle of the toothing is aligned in such a way that oil flowing from the cavity into the gap is conveyed with the aid of the toothing in the direction of the oil sump.

Preferably, a shielding element is provided, which covers, in sections or partially, the face end of the gearwheel facing away from the gear set of the transmission. Due to such a shielding element, a foaming of oil by the gearwheel can be reduced.

The transmission can be utilized in a drive train for a motor vehicle.

BRIEF DESCRIPTION OF THE DRAWINGS

Exemplary embodiments of the invention are described in detail in the following with reference to the attached figures. Wherein.

DETAILED DESCRIPTION

Figure 1:
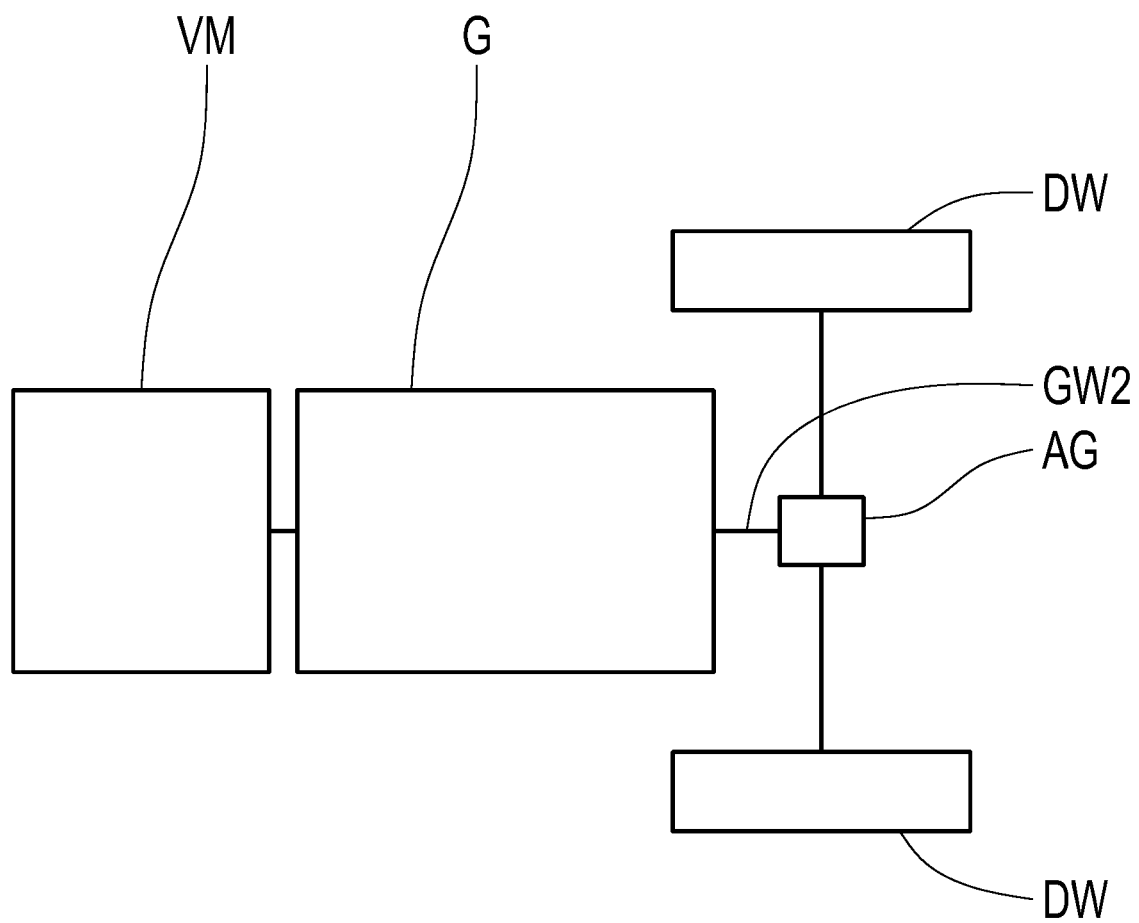
FIG. 1 shows a schematic of a drive train for a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagrammatically shows a drive train for a motor vehicle. The drive train includes an internal combustion engine VM, the crankshaft of which is coupled to an input side of a transmission G. The transmission G is connected on the output side to a differential gear AG. The power present at an output shaft GW2 of the transmission G is distributed to driving wheels DW of the motor vehicle via the differential gear AG.

Figure 2:
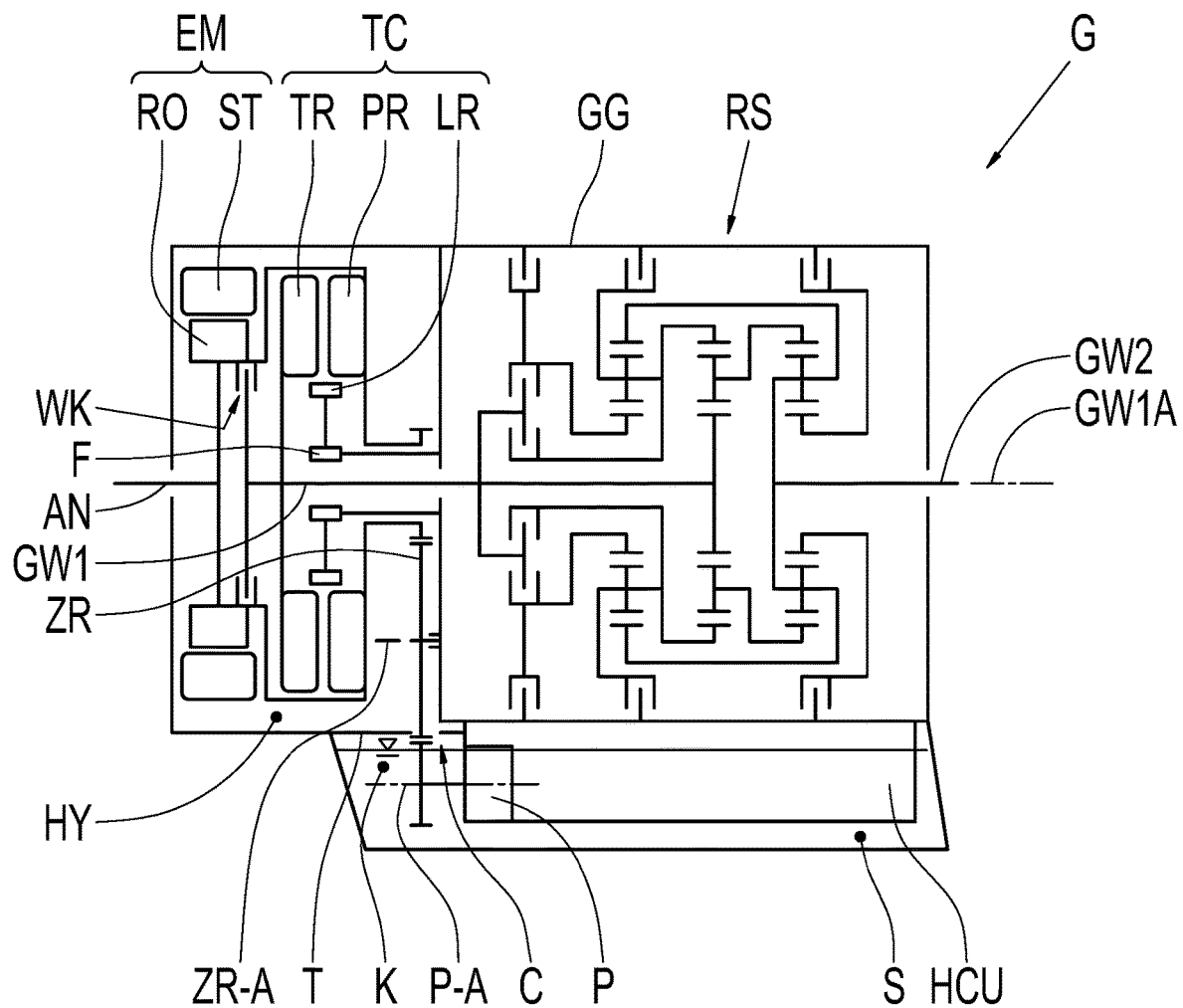
FIG. 2 through FIG. 5 each show a schematic of a transmission for a motor vehicle.

FIG. 2 shows a schematic of such a transmission G according to a first exemplary embodiment. The transmission G includes a gear set RS, which is composed of multiple planetary gear sets in this case, by way of example. Alternatively or additionally, the gear set RS can be formed from multiple spur gear trains and/or from a flexible traction drive mechanism, for example, as a CVT transmission. The gear set RS, together with the shift elements arranged therein, is configured for providing different transmission ratios between an input shaft GW1 of the transmission G and the output shaft GW2. The gear set RS is enclosed by a housing GG. The housing GG can consist of multiple individual parts.

The transmission G includes a cavity HY on the input side. A torque converter TC as well as an electric machine EM are arranged in the cavity HY. The torque converter TC includes an impeller PR, a turbine wheel TR, and a stator LR, which cooperate hydrodynamically in a known way. The electric machine EM includes a rotationally fixed stator ST and a rotary rotor RO. An input-aside hub AN is connected to the rotor RO and to the impeller PR. The input shaft GW1 is connected to the turbine wheel TR. The hub AN and the input shaft GW1 are connectable to one another with the aid of a torque converter lockup clutch WK. In the engaged condition of the torque converter lockup clutch WK, the torque converter TC is locked up. The stator LR is supported on the housing GG via a freewheel unit F. Further components, for example, one or multiple torsional vibration damper(s), can be arranged in the cavity HY.

Moreover, the transmission G includes an oil sump S, a pump P, and a hydraulic control unit HCU. The oil level in the oil sump S is indicated in FIG. The oil level varies, of course, depending on the temperature of the oil, the geometric position of the transmission G, and centrifugal forces acting on the oil. The transmission G can also include an oil reservoir. The pump P is configured for scavenging oil out of the oil sump S and delivering the oil to the hydraulic control unit HCU. The hydraulic control unit HCU is configured for feeding the oil delivered by the pump P to components of the gear set RS, to the torque converter TC, to the torque converter lockup clutch WK, and to the cooling of the electric machine EM. The oil delivered in such a way then flows back into the oil sump S, so that a closed oil circuit is formed.

The pump P is mechanically connected via a gearwheel ZR to the rotor RO. If the rotor RO rotates, the turning motion is transmitted via the gearwheel ZR to a pump shaft of the pump P, in order to drive the pump P. The axis of rotation ZR-A of the gearwheel ZR is spatially arranged between an axis of rotation GW1-A of the input shaft GW1 and an axis of rotation P-A of the pump shaft P.

The oil flowing out of the cavity HY back into the oil sump S enters the oil sump S through a gap C. A partition T is provided in order to reduce the gap C. The separating element T can be an integral part of the housing GG. Alternatively, the separating element T can be connected, as an independent component, directly or indirectly to the housing GG. The separating element T is immovable. "Immovable" is understood to mean, in this case, that the separating element T is not configured for changing position in response to a flowing motion of the oil, as is the case, for example, with a spring-loaded flap. A mechanically flexible configuration of the separating element T, for example, as a thin-walled plastic shell, is considered, however, to be a possible embodiment of an "immovable" separating element T.

The separating element T delimits the cavity HY, in sections or partially, with respect to a chamber K, which is associated with the oil sump S. As a result, the separating element T makes it difficult for oil to flow, starting from the oil sump S, into the cavity HY. If the transmission G according to the representation in FIG. 1 is inclined in the counter-clockwise direction, oil from the oil sump S does not enter the cavity HY through the cap C until the chamber K is completely filled with oil. This applies in the same way in the case of a centrifugal force acting on the oil in the oil sump S, the centrifugal force acting toward the left according to the representation of the transmission G in FIG. 1.

The gearwheel ZR extends through the gap C, in order to transmit drive power from the shaft, which is connected to the rotor RO, to the pump P At least one means, which is configured for delivering oil out of the gap C in the direction of the oil sump S, can be formed on or attached to the gearwheel ZR. Appropriate exemplary embodiments are described in greater detail in FIG. 6, FIG. 7, and in FIG. 8a and FIG. 8b.

Figure 3:
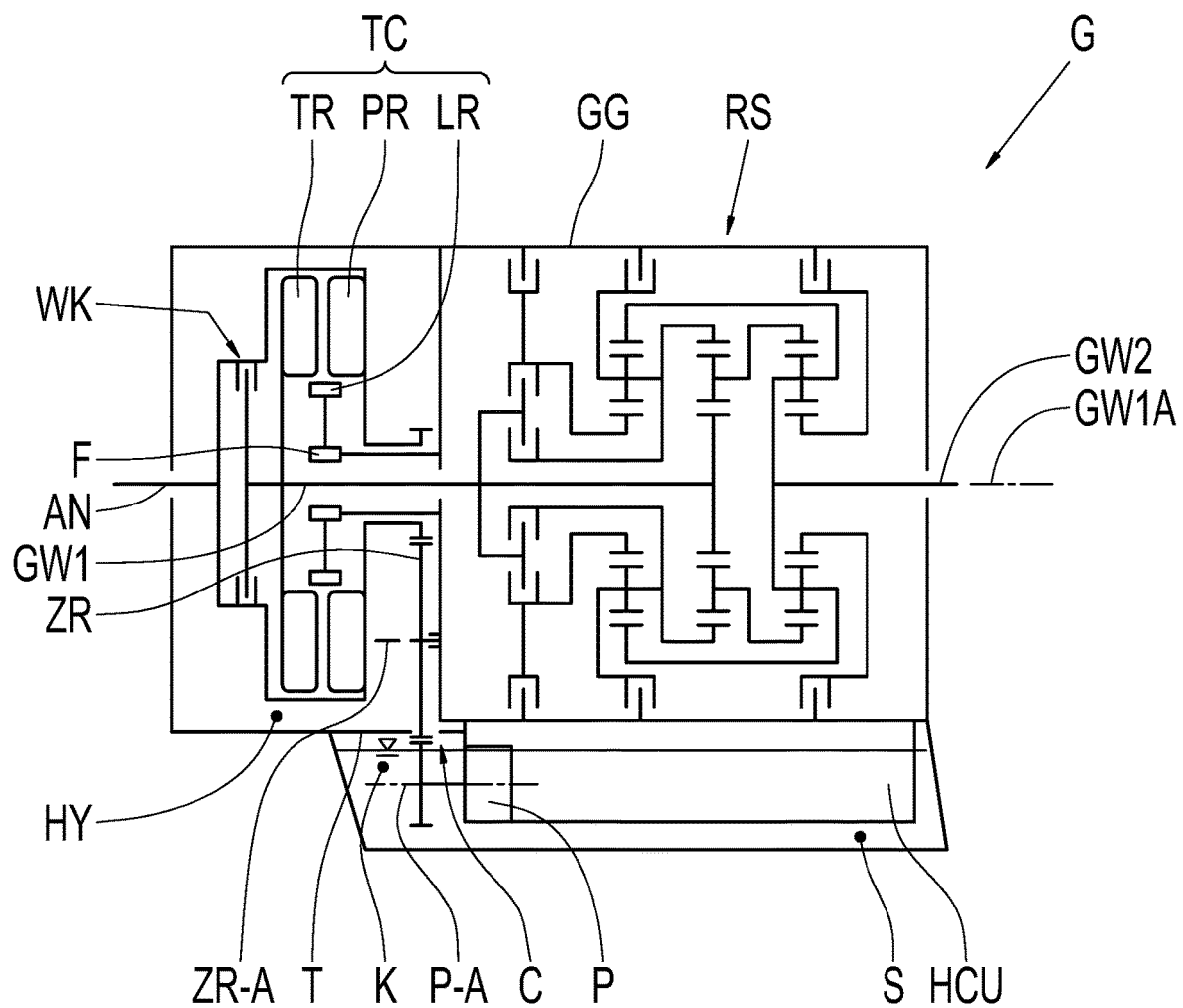

FIG. 3 shows a schematic of a transmission G according to a second exemplary embodiment. In contrast to the exemplary embodiment according to FIG. 1, the transmission G does not include an electric machine EM in this case.

Figure 4:
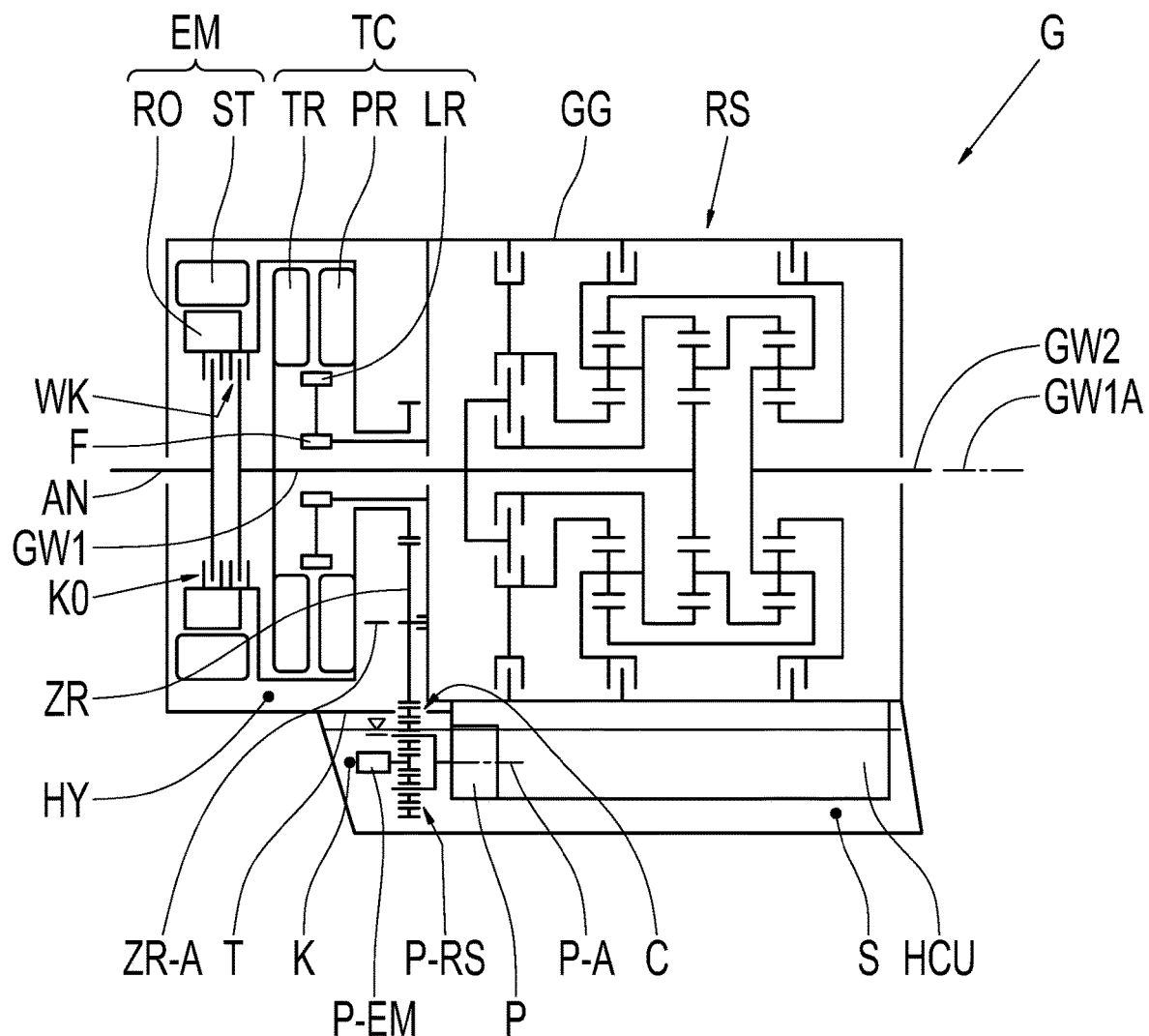

FIG. 4 shows a schematic of a transmission G according to a third exemplary embodiment. In contrast to the exemplary embodiment according to FIG. 1, the transmission G includes, in this case, a separating clutch K0 between the rotor RO and the hub AN. The separating clutch K0 is also arranged in the cavity HY and can be actuated and/or cooled, as necessary, with oil via the hydraulic control unit HCU.

In addition, the drive of the pump P differs from the exemplary embodiments represented in FIG. 2 and FIG. 3. A planetary gear set P-RS is arranged in the power flow between the rotor RO and the pump P in this case. The planetary gear set P-RS includes a sun gear, a planet carrier including multiple planet gears rotatably mounted thereon, as well as a ring gear. The sun gear is connected to an electric motor P-EM and intermeshes with the planet gears. The planet carrier is connected to the pump shaft of the pump P. The ring gear intermeshes with the planet gears and includes, on an outer circumference of the ring gear, a toothing, which intermeshes with the toothing of the gearwheel ZR Due to such a configuration, the pump P can be driven, on the one hand, by the shaft connected to the rotor RO as well as by the electric motor P-EM. The electric motor P-EM is arranged in the chamber K.

Figure 5:
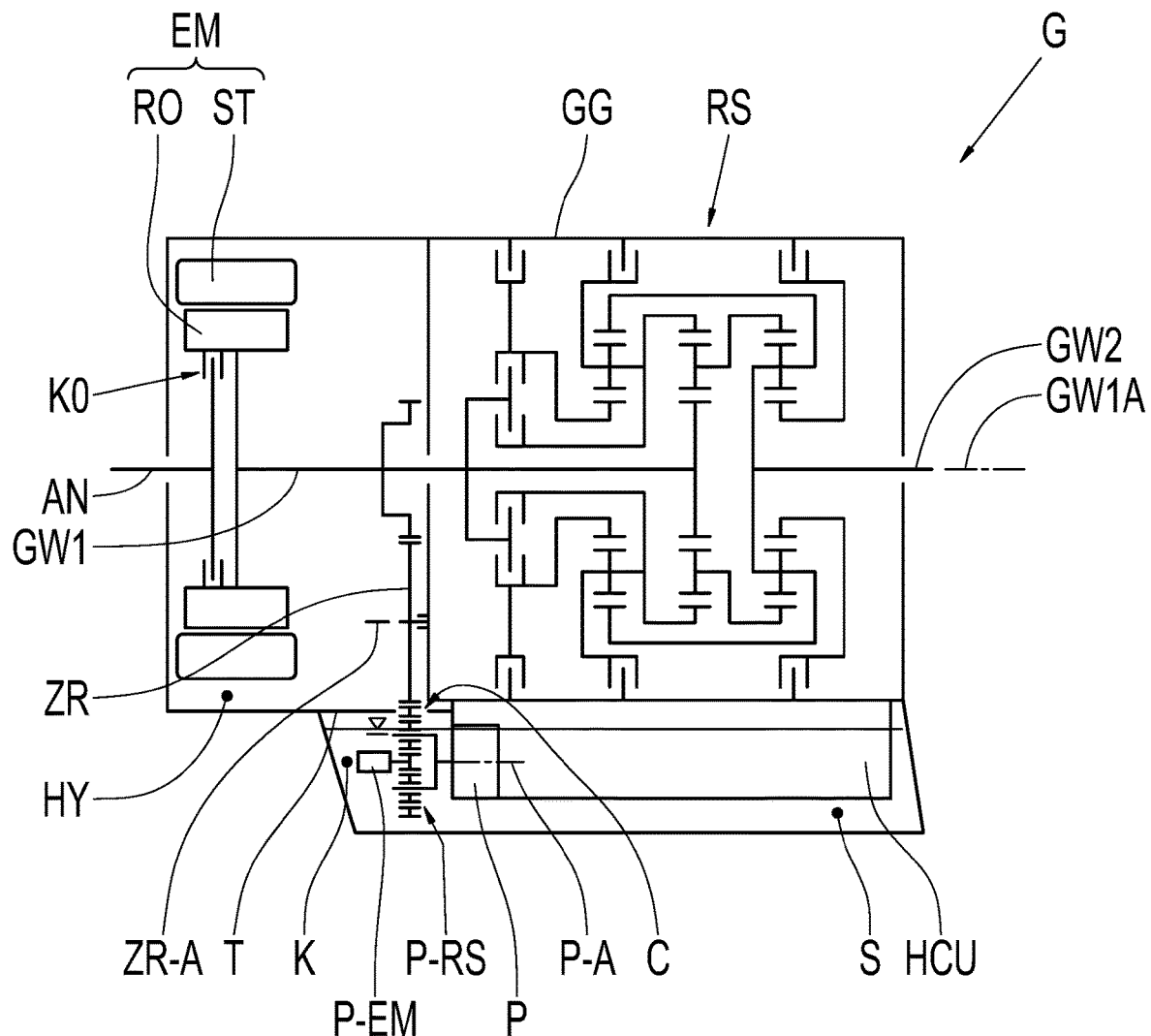

FIG. 5 shows a schematic of a transmission G according to a fourth exemplary embodiment. In contrast to the exemplary embodiment according to FIG. 4, the torque converter TC is omitted. The rotor RO is directly connected to the input shaft GW1 in this case. The gearwheel ZR also cooperates directly with the input shaft GW1 in this case.

A transmission gearing can be arranged between the rotor RO and the input shaft GW1, for example, in order to increase the rotational speed of the rotor RO with respect to the rotational speed of the input shaft GW1 The transmission gearing can be designed, for example, as a planetary gear set. Such an embodiment is not represented in the figures.

Figure 6:
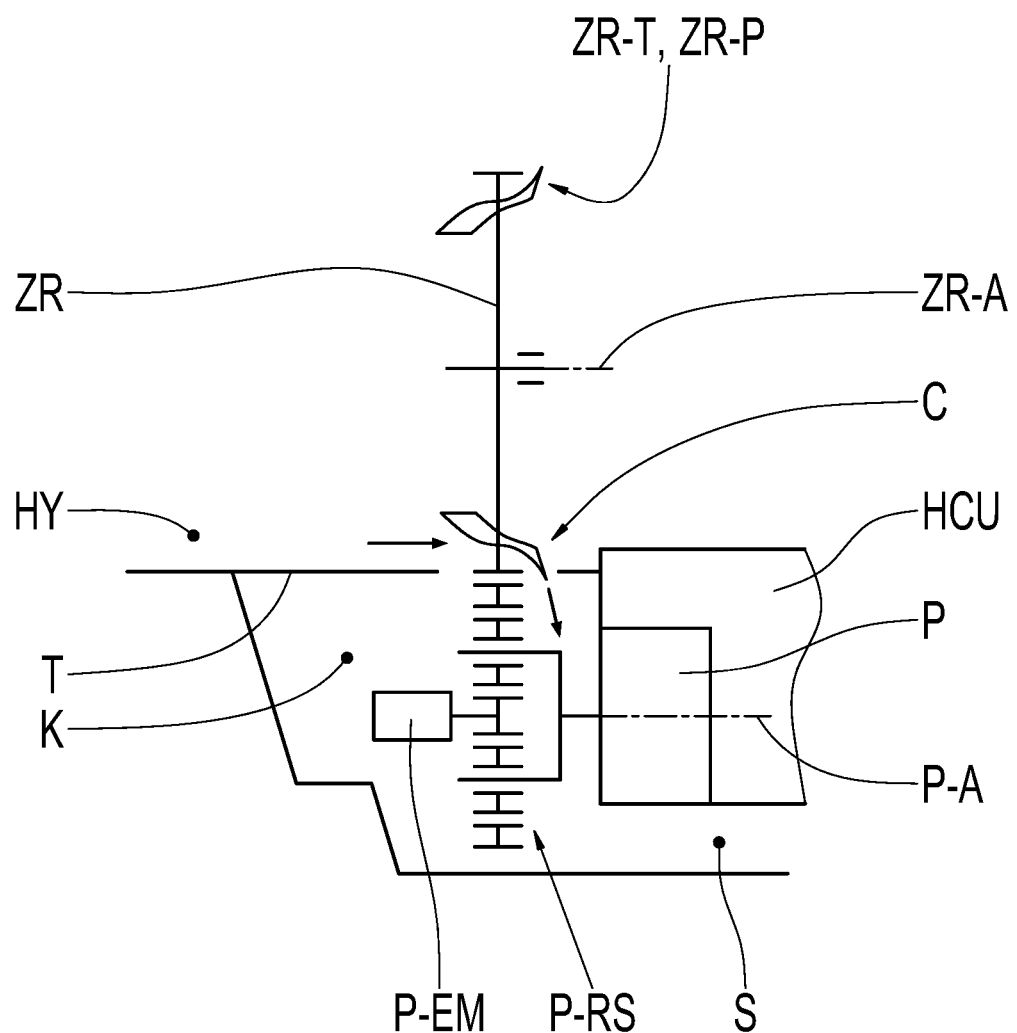
FIG. 6 and FIG. 7 each show a detailed section of such a transmission.
Figure 7:
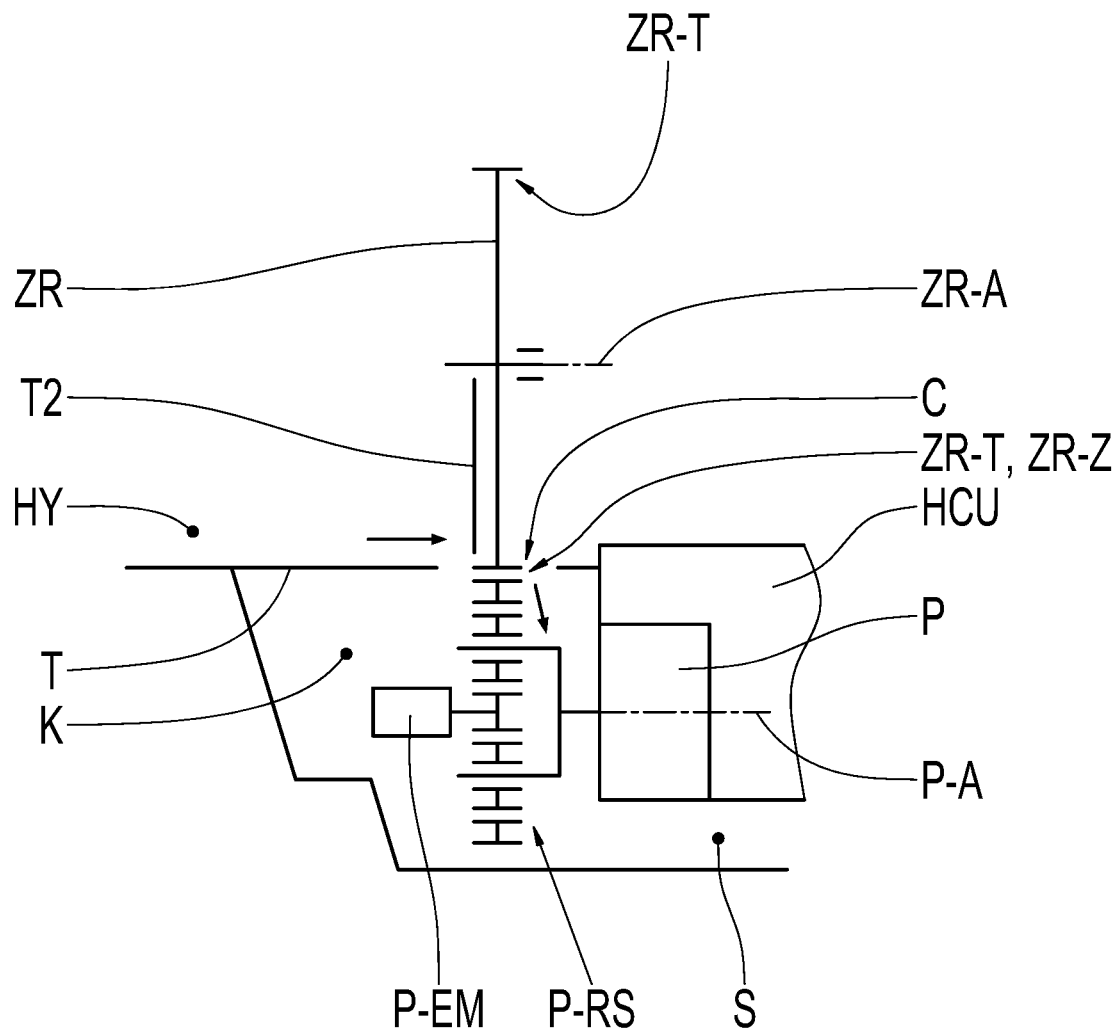

FIG. 6 and FIG. 7 show detailed sections of various exemplary embodiments of the transmission G, in which the gearwheel ZR and the gap C between the cavity HY and the oil sump S are more readily apparent. The drive of the pump P includes, by way of example, the planetary gear set P-RS and the electric motor P-EM. The drive of the pump P could also take place exclusively with the aid of the gearwheel ZR; this variant is not explicitly represented, however.

In FIG. 6, the gearwheel ZR includes a means ZR-T for delivering oil out of the gap C in the direction of the oil sump S. In the given exemplary embodiment, the means ZR-T is designed as an impeller geometry ZR-P, which is attached to the gearwheel ZR, for example, with the aid of a welded joint. The geometry of the impeller ZR-P represented specifically in FIG. 6 is to be considered merely by way of example. The impeller ZR-P acts as a pump element and assists the flow of oil out of the cavity HY back into the oil sump S. The corresponding oil flow is indicated in FIG. 6 by arrows.

In FIG. 7, the toothing ZR-Z between the gearwheel ZR and the external gearing formed on the ring gear of the planetary gear set P-RS forms the means ZR-T, which is configured for delivering oil out of the gap C in the direction of the oil sump S. The toothing ZR-Z can be designed, for example, as oblique toothing. A helix angle of the toothing ZR-Z can be aligned in such a way that oil flowing from the cavity HY into the gap C can be conveyed, with the aid of the toothing ZR-Z, in the direction of the oil sump S. A shielding element T2 is provided in order to improve the suction action of the toothing ZR-Z. The shielding element T2 covers the gearwheel ZR-T in sections or partially, so that an afflux cross-section from the cavity HY to the gap C is decreased. The shielding element T2 can be connected to the separating element T.

Figure 8A:
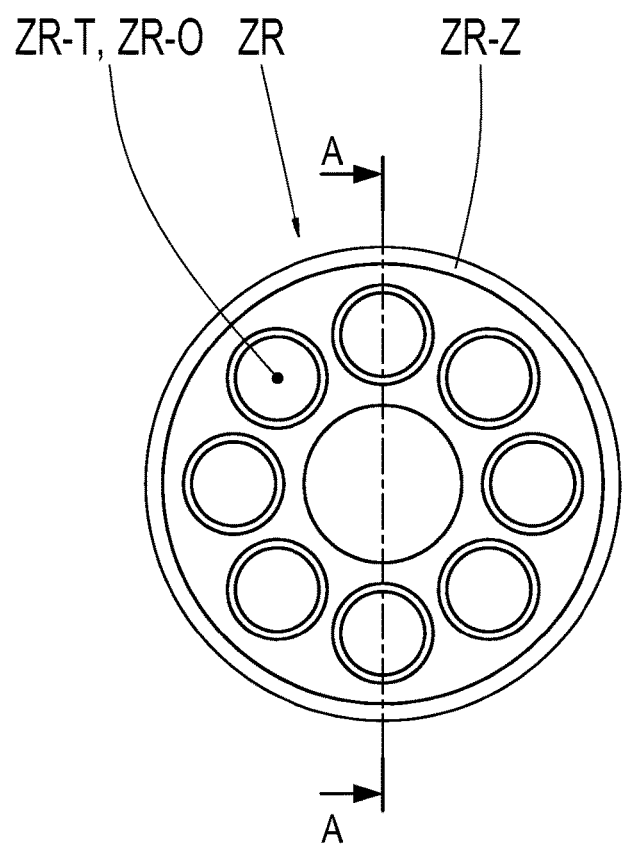
FIG. 8a and FIG. 8b show an embodiment of a gearwheel.
Figure 8B:
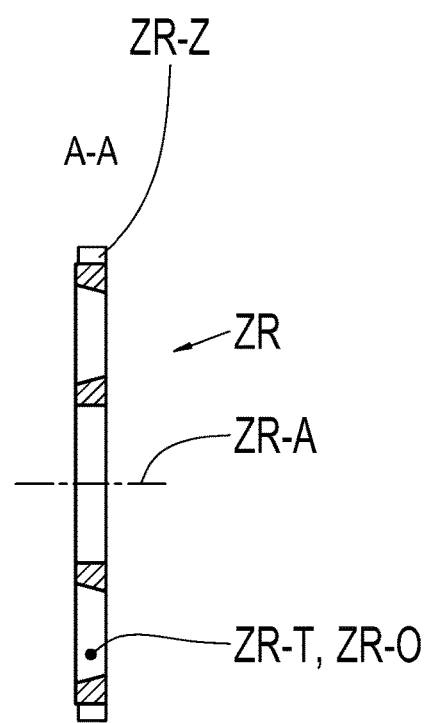

FIG. 8a shows a possible embodiment of the gearwheel ZR. A cross-section of the gearwheel ZR according to the cutting plane A-A is represented in FIG. 8b. The gearwheel ZR includes multiple openings ZR-O distributed at the circumference, which contribute to the weight reduction of the gearwheel ZR. As is clearly apparent from FIG. 8b, the openings ZR-O are conically formed. Due to this embodiment of the openings ZR-O, oil can be conveyed out of the cavity HY in the direction of the gap C and further in the direction of the oil sump S.

The means ZR-T represented in FIG. 6, FIG. 7, FIG. 8a, and FIG. 8b can also be combined with one another, in order to improve the delivery of oil out of the gap C in the direction of the oil sump S.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
GW1 input shaft
GW1-A axis of rotation
GW2 output shaft
RS gear set
AN hub
GG housing
HY cavity
TC torque converter
PR impeller
TR turbine wheel
LR stator
F freewheel unit
WK torque converter lockup clutch
K0 separating clutch
EM electric machine
ST stator
RO rotor P pump
P-A axis of rotation
P-EM electric motor
P-RS planetary gear set
HCU hydraulic control unit
S oil sump
C gap
K chamber
T separating element
T2 shielding element
ZR gearwheel
ZR-A axis of rotation
ZR-T means
ZR-P pump element
ZR-Z toothing
ZR-O opening
VM internal combustion engine
AG differential gear
DW driving wheel

The invention claimed is:

1. A transmission for a motor vehicle, comprising:
a pump;
an oil sump;
a hydraulic control unit;
a gear set for providing various transmission ratios between an input shaft and an output shaft of the transmission; and
a cavity arranged on an input side of the transmission, one or both of a torque converter and an electric machine accommodated within the cavity,
wherein the pump is configured for scavenging oil from the oil sump and delivering the oil to the hydraulic control unit,
wherein the hydraulic control unit is configured for feeding the oil delivered by the pump to components of the gear set and to the one or both of the torque converter and the electric machine,
wherein the cavity is connected to the oil sump via a gap configured for passive return of one of both of lube oil and cooling oil out of the cavity into the oil sump,
wherein a separating element is arranged at the gap in order to reduce the gap, and the separating element is configured for obstruction of an oil flow out of the oil sump to the cavity through the gap, and
wherein the oil pump is drivable via a gearwheel, an axis of rotation of the gearwheel is spatially arranged between an axis of rotation of the input shaft and an axis of rotation of a pump shaft of the pump, and at least a portion of the gearwheel extends through the gap.

2. The transmission of claim 1, wherein the separating element is an integral part of a housing of the transmission.

3. The transmission of claim 1, wherein the separating element is an oil guiding element connected to the housing of the transmission.

4. The transmission of claim 1, wherein the separating element is immovable.

5. The transmission of claim 1, wherein the separating element is essentially oriented horizontally.

6. The transmission of claim 1, wherein the separating element partially delimits a chamber associated with the oil sump, and the separating element is configured such that an oil flow out of the oil sump into the cavity induced by inclination does not flow until the chamber is completely filled with oil.

7. The transmission of claim 6, wherein an electric motor configured for driving the pump is arranged in the chamber.

8. The transmission of claim 1, wherein at least one means for conveying oil out of the gap and towards the oil sump is formed on or attached to the gearwheel.

9. The transmission of claim 8, wherein the at least one means comprises a plurality of conical openings formed in a cross-section of the gearwheel.

10. The transmission of claim 8, wherein the at least one means comprises a pump element attached to or formed on the gearwheel.

11. The transmission of claim 8, wherein the at least one means comprises a toothing of the gearwheel.

12. The transmission of claim 9, wherein the toothing is an oblique toothing, and a helix angle of the toothing is oriented such that oil flowing from the cavity into the gap is conveyed by the toothing towards the oil sump.

13. The transmission of claim 1, wherein a side of the gearwheel facing away from the gear set is partially covered with a shielding element.

14. A drive train for a motor vehicle, comprising the transmission of claim 1.

* * * * *